April 24, 1956 E. D. MEADOWS 2,742,663
CASTER
Filed Nov. 24, 1953
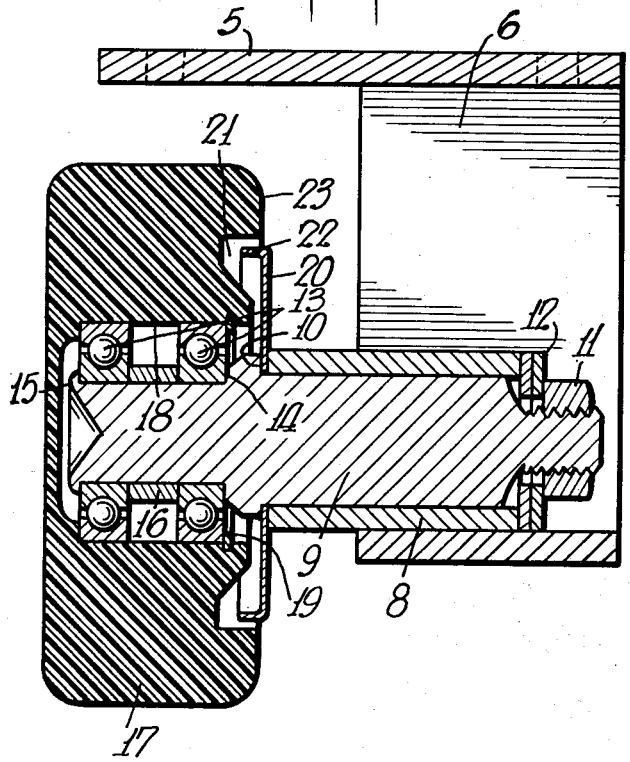
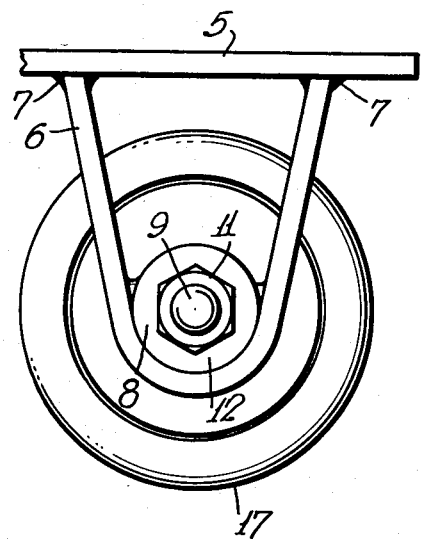
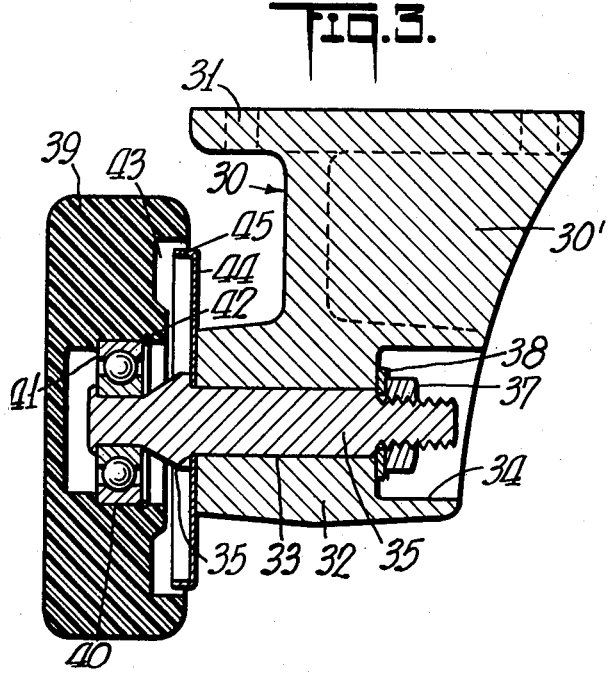
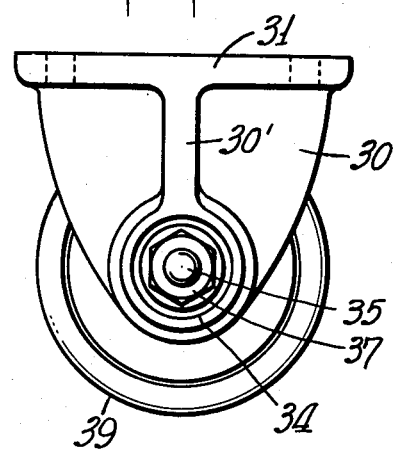
INVENTOR.
Ernest D. Meadows
BY Mitchell Bechert
ATTORNEYS

United States Patent Office 2,742,663
Patented Apr. 24, 1956

2,742,663

CASTER

Ernest D. Meadows, Atlanta, Ga., assignor to Meadows Manufacturing Company, Atlanta, Ga., a corporation of Georgia Application November 24, 1953, Serial No. 394,023

1 Claim. (Cl. 16—40)

My invention relates to a caster, and more particularly to a caster for use on a wagon or dolly in a textile mill.

The wagons for carting yarn and other materials about a textile mill are usually mounted on casters and the wheels or axles often pick up thread or lint from the floor and carry it around the wheel so that it often encircles the axle and is wrapped tightly thereon so as to choke or otherwise impair the caster function.

It is an object of my invention to provide an improved caster and one which will tend to limit the "wrap" and the tendency of the wheel to pick up lint and wrap it around the axle.

It is another object to provide a caster so arranged that, if the wheel does pick up lint, string and the like it may be carried around and dropped onto a non-rotatable surface, so that there is little likelihood of having the lint or yarn wrapped around the axle so as to impair the use of the caster.

Other objects and various features of novelty and invention will be pointed out or will become apparent to those skilled in the art.

In the drawings, which show, for illustrative purposes only, preferred forms of the invention—

Fig. 1 is a vertical sectional view through a caster illustrating one form of the invention;

Fig. 2 is a reduced scale view in axial right hand elevation of the caster shown in Fig. 1;

Fig. 3 is a view similar to Fig. 1, but illustrating a modification;

Fig. 4 is a view similar to Fig. 2, but illustrating in axial right hand elevation that form of the invention shown in Fig. 3.

In the form shown in Figs. 1 and 2, there is a base or plate 5, to be secured to the underside of a wagon or dolly for mounting the caster in place. A generally U-shaped metal strap or body member 6 has the upper ends of the legs secured to the base member 5, as by means of welding, as shown at 7. Welded or otherwise secured in the bend of the U-strap 6 is a cylinder 8, which extends out substantially beyond the end of the strap 6, as shown in Fig. 1. The base 5, strap 6, and cylinder 8, in effect, form the housing or bracket for supporting and holding the wheel and axle.

In the form illustrated, I employ an axle 9, which has a shoulder 10 intermediate the ends which in effect may butt the lefthand end of the tube or sleeve 8. The cylindrical body of the axle 9 is slid into the sleeve 8 and fits snugly therein. The rear end of the axle is threaded and carries a securing nut 11, which takes against the end of the sleeve 8 or shims or washers 12, as will be clear, so that the axle is very rigidly and securely held in the sleeve 8. Since the sleeve 8 fixedly carries the axle proper, the sleeve may be considered as part of the axle means. The forward or free end of the axle is reduced somewhat in diameter, and carries one or more anti-friction bearings 13.

The bearings, when two are employed, may be held on the shaft or axle between the shoulder 14 and the upset or beaded over end 15, and a spacer sleeve 16 may be interposed between the two bearings.

While the roller itself may be made of any suitable form and material, I illustrate it as a solid roller 17, cored out or bored as indicated at 18, to snugly receive the outer rings of the antifriction bearings 13, as will be understood. The bearings may be held in the bore by any suitable means such as a snap ring 19.

In order to exclude dust, lint, yarn and other debris from the bearings and to minimize wrapping of string or yarn about the axle and choking the caster, I employ a shield 20, which in the form shown is a disc securely held between the shoulder 10 on the axle and the adjacent end of the cylinder or sleeve 8. The wheel or roller 17 is recessed, as indicated at 21, and the outer edge of the shield disc 20 is flanged or cupped inwardly, as indicated at 22, so as to fit more or less snugly within the recessed or bored out portion 21 and thus prevent the entrance of foreign matter.

It will be seen that, if yarn or string is picked up by the roller 17, it may be carried to the top and may drop off on the inner or righthand side, as viewed in Fig. 1, and if it does it will likely fall on the stationary cylinder 8 or in the strap 6 or other stationary part. The only portion of the wheel 17 which is exposed on the inside is the relatively short radial surface 23, which is not likely to retain any hold on the string or yarn and which, therefore, is not likely to cause the yarn to wrap around the axle or any other stationary parts. Furthermore, the inner side of the wheel 17 and the shield 20, which as illustrated, are practically continuations of each other, are both spaced at a very substantial distance away from the adjacent edge of the strap 6, and therefore any string or yarn which falls on any of the stationary parts may fall off or be readily removed, because the space is so large as to provide ready access to any foreign material on the stationary parts. With such a wide space between the wheel and the strap, there is practically no tendency for any yarn or string to wind up and jam, as might be the case if the space were very small.

In that form of the invention shown in Figs. 3 and 4, the base or bracket in general 30 may be a webbed casting and have an enlarged foot portion or base 31 corresponding to the plate 5 of the first form of the invention. The frame or base 30 may have a reinforcing rib 30' and a substantial integral boss 32 which may be bored, as indicated at 33, and counterbored, as indicated at 34. The axle 35 fits snugly within the bore 33 and a shoulder on the axle may butt against the end surface of the very substantial boss 32. The rear end of the axle 35 is preferably threaded and carries a nut 37 which may abut the bottom of the counterbore 34 or the washer 38. Thus, the axle is very rigidly held on the base or the housing 30.

The caster wheel 39 is cored out or bored, as indicated at 40, for the reception of bearing means in the form of a ball bearing 41, as illustrated in Fig. 3. This ball bearing may be secured within the bore 40, as by means of a snap ring 42, as will be understood. While a single bearing is illustrated in Fig. 3, it is to be understood that a double-row bearing or two bearings could be used here, and it is also to be understood that in Fig. 1 a single bearing might be used.

The caster wheel 39 is bored out or recessed, as shown at 43, and a dust shield 44, corresponding in all respects to the dust shield 20 in the first form, is rigidly held by the shoulder 35 and the adjacent face of the boss 36; and the outer edge of the shield is turned or cupped inwardly, as shown at 45, so as to be a relatively snug fit, as heretofore described in connection with Fig. 1, and for the same purpose.

It will be seen that the boss 32 extends out very substantially from the main part of the base 30 and that, therefore, there is a very substantial axial space between the base 30 and the dust shield 44 and the wheel 39. This extensive axial space serves the purpose described in connection with Fig. 1. This wide space greatly reduces the danger of any string or yarn carried up by the wheel wrapping around the boss or axle and jamming the roller. In both forms of the invention illustrated the axial space between the stationary shield and the sustaining bracket is about one half the diameter of the bracket at a point adjacent the shield.

With the dust shield arranged as shown in both of the figures, it is almost impossible for a piece or string or yarn to be drawn into the space between the in-turned flange or cup and the adjacent surface of the roller. Any yarn or string that should wind up in the extensive axial space referred to will not jam, and may be readily removed or cut off so as to always maintain a clean, yarn-free caster.

While the invention has been described in considerable detail and preferred forms illustrated, it is to be understood that various changes may be made within the scope of the invention as defined in the appended claim.

I claim:

In a caster, a bracket to be secured to the supported member, said bracket comprising a generally U-shaped strap, a tube sleeve integrally secured to the strap in the bend of the U, said tube sleeve being of a length to project at a first end substantially beyond a first edge of the strap and at the second end to terminate a substantial distance inside the adjacent second edge of the strap, an axle member in said tube sleeve and having means intermediate its ends to abut the projecting first end of said tube sleeve to limit the position in the tube sleeve of said axle in one direction, an antifriction bearing mounted on the outwardly projecting end of said axle, a caster wheel mounted on said antifriction bearing, said axle being extended through said tube sleeve and terminating short of the said second edge of the strap, and means on said axle and located in the space between the said second ends of said strap and tube sleeve for holding said axle rigidly in place in said tube sleeve.

References Cited in the file of this patent

UNITED STATES PATENTS

| | | |
|---|---|---|
| 539,543 | Ransden et al. | May 21, 1895 |
| 1,900,108 | Hedeen et al. | Mar. 7, 1933 |
| 2,039,875 | Benson | May 5, 1936 |

FOREIGN PATENTS

| | | |
|---|---|---|
| 434,279 | Great Britain | Aug. 26, 1935 |
| 449,334 | Great Britain | June 25, 1936 |